United States Patent [19]
Bardot et al.

[11] Patent Number: 5,342,521
[45] Date of Patent: Aug. 30, 1994

[54] REVERSE OSMOSIS OR NANOFILTRATION MEMBRANE AND ITS PRODUCTION PROCESS

[75] Inventors: Colette Bardot, Villeurbanne; Maurice Carles, Pierrelatte; René Desplantes, Espeluche; Luc Shrive, Pont St Esprit, all of France

[73] Assignee: Commissariat a l'Energie Atomique, Paris, France

[21] Appl. No.: 39,264

[22] PCT Filed: Oct. 21, 1991

[86] PCT No.: PCT/FR91/00826
§ 371 Date: Apr. 21, 1993
§ 102(e) Date: Apr. 21, 1993

[87] PCT Pub. No.: WO92/06775
PCT Pub. Date: Apr. 30, 1992

[30] Foreign Application Priority Data
Oct. 22, 1990 [FR] France ................ 90 13031

[51] Int. Cl.⁵ ............................................. B01D 71/02
[52] U.S. Cl. ................. 210/490; 210/500.25; 210/500.26; 210/500.42
[58] Field of Search ............. 210/500.25, 500.26, 210/490, 638, 500.27, 500.42; 264/41.49; 427/255, 256, 254

[56] References Cited

U.S. PATENT DOCUMENTS

| | | |
|---|---|---|
| 4,741,744 | 5/1988 | Wu et al. . |
| 4,861,480 | 8/1989 | Berardo et al. ............ 210/500.25 X |
| 4,865,930 | 9/1989 | Kindler et al. ....................... 429/192 |

FOREIGN PATENT DOCUMENTS

| | | |
|---|---|---|
| 0249513 | 12/1987 | European Pat. Off. . |
| 0250327 | 12/1987 | European Pat. Off. . |
| 0288380 | 10/1988 | European Pat. Off. . |
| 8806477 | 9/1988 | World Int. Prop. O. . |

OTHER PUBLICATIONS

I.E.C. Product Research and Developement, vol. 2, No. 3, Sep. 1981, American Chemical Society, (Washington, US) H. Murakami et al.: "PBIL tubular reverse osmosis. Application as low-energy concentrators", pp. 501-508.

*Primary Examiner*—Frank Spear
*Attorney, Agent, or Firm*—Oblon, Spivak, McClelland, Maier & Neustadt

[57] ABSTRACT

The invention relates to a reverse osmosis or nanofiltration membrane and to its production process. This membrane comprises a porous support made from an inorganic material coated on one face with a first mesoporous inorganic material layer, e.g. of $TiO_2$, having a mean pore radius below 10 nm and a second active layer, having a thickness of 0.1 to 1 $\mu$m, made from sulphonated polysulphone, polybenzimidazolone, grafted polyvinylidine fluoride or Nafion. ®

10 Claims, No Drawings

REVERSE OSMOSIS OR NANOFILTRATION MEMBRANE AND ITS PRODUCTION PROCESS

The present invention relates to a reverse osmosis or nanofiltration membrane or diaphragm more particularly usable in the agroalimentary and pharmaceutical industries.

It more specifically relates to organomineral membranes having high permeability levels and a good resistance to high pressures and aggressive chemical treatments such as steam sterilization at 120° C. and washing by acid or basic solutions.

It is pointed out that a semipermeable membrane is a membrane having an active layer with the property of permitting the selective diffusion of certain species, so as to retain the selected species such as sodium chloride.

A nanofiltration membrane is a membrane making it possible to retain substances having a molecular weight above a certain threshold falling within the range 50 to 1000.

Organomineral membranes are membranes having an inorganic material porous support on which is located an organic polymer active layer. Organomineral membranes are in particular described in U.S. Pat. No. 4,861,480, EP-A-250 327 and Japanese patent application published under No. 59-206008 in the name of the TDK Corporation.

In U.S. Pat. No. 4,861,480, these organomineral membranes are semipermeable membranes constituted by an inorganic material porous support having an outer microporous layer with a thickness of 1 to 2 μm, covered with a semipermeable, dense organic layer based on a polyvinylidine fluoride polymer or copolymer having functional groups giving the membrane a selective permeability with respect to water or other solvents. These membranes are more particularly usable as reverse osmosis membranes for e.g. retaining sodium chloride.

EP-A-250 327 describes an ultrafiltration, hyperfiltration or demineralization element having an inorganic material porous support and an asymmetrical, partitioned, microporous, organic polymer membrane, formed on one of the faces of the porous support and fitted into the pores of the porous support flush with said surface without projecting beyond the same. This element can be used for the demineralization of water by the Donnan effect. In this element, the separating layer is fitted into the surface pores of a porous support, which makes it possible to treat effluents without prefiltration, because the separating layer is slightly set back with respect to the surface of the support, so that it is insensitive to impacts of any solid suspended particles.

In this document, the thickness of the separating layer is 25 to 200 μm, which leads to permeabilities to water of 0.05 to $2.5 \cdot 10^{-5} m.d^{-1}.Pa^{-1}$.

Although the membranes described in these two documents have satisfactory properties, it would be of interest to be able to further improve their permeability to the treated solutions.

Japanese patent application 59-206008 describes a filter having a ceramic porous support on which is located a semipermeable, thin organic membrane usable for reverse osmosis. In this case, the thickness is at least 1 μm. Thus, it is possible to obtain good permeability levels, but the organic materials used are not appropriate for the separation of solutes in the molecular weight range 50 to 1000.

The present invention relates to a reverse osmosis or nanofiltration organomineral membrane having improved properties compared with the membranes described hereinbefore.

According to the invention, the reverse osmosis or nanofiltration membrane comprises an inorganic material porous support coated on one face with a first inorganic material mesoporous layer having a mean pore radius below 10 nm and a second active layer placed on the first mesoporous layer and having a thickness of 0.1 to 1 μm, being made from an organomineral polymer or an organic polymer chosen from within the group including sulphonated polysulphones, polybenzimidazolones, polyvinylidine fluorides grafted by diaminoethyl methacrylate and perfluorine ionomers.

In this membrane, the choice of polymers constituting the second active layer more particularly makes it possible to obtain even thinner active layers than in the case of U.S. Pat. No. 4,861,480, whilst significantly improving the permeability of the membrane to the treated solutions. Moreover, the polymers used also make it possible to increase the affinity of the membrane for the solvent of the treated solutions, which also improves the permeability.

Thus, when the treated solutions are aqueous or polar solutions, the active layer is produced from a hydrophilic polymer, e.g. polybenzimidazolone, polyvinylidine fluoride grafted by diaminoethyl methacrylate, sulphonated polysulphone or perfluorine ionomer having cation exchange groups e.g. in accordance with formulas —SO₃M or —COOM with M representing a proton, a metal cation or a more complex cationic entity.

As examples of such ionomers, reference can be made to the sulphonic perfluorine polymer in accordance with the formula:

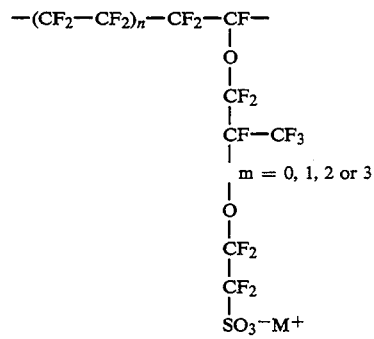

in which M represents a proton, a metal cation or a complex cation, m is an integer from 0 to 3 and n is an integer from 0 to 16. This ionomer is marketed under the trademark Nafion.

In this case, it is also possible to use organomineral polymers such as polyphosphazenes and polymers containing silicon.

In the membrane according to the invention, the good mechanical properties and the good pressure resistance are more particularly due to the presence of the inorganic material support.

Inorganic materials which can be used for producing this support can be metals or metal alloys, e.g. nickel and nickel alloys, stainless steel or any other alloy which is insensitive to corrosion in the medium used. It is also possible to use porous carbon, or a ceramic material such as an oxide, a carbide, a nitride or a silicide, e.g. silicon carbide or alumina.

According to the invention, the first mesoporous layer placed on the support, which has a mean pore radius below 10 nm, can be produced from single or mixed metal oxide or hydroxide, e.g. alumina, zirconium dioxide or titanium dioxide.

The invention also relates to a process for the production of the reverse osmosis or nanofiltration membrane described hereinbefore. This process comprises the following successive stages:

a) application to one face of an inorganic material porous support of a colloidal solution of the inorganic material for forming the first mesoporous layer,
b) drying the thus applied colloidal solution,
c) heat treatment to the dried layer,
d) introduction into the pores of the thus dried layer of a compound able to block the pores,
e) contacting the support coated with the first mesoporous layer containing said compound with a solution of an organomineral polymer or the organic polymer for forming the second layer in a solvent not dissolving the compound used in stage d),
f) drying the solution in order to evaporate the solvent and
g) immersion of the thus treated support in a liquid able to dissolve the compound used in stage d) without dissolving the first mesoporous layer and the second active layer.

The use, according to the process of the invention, of a compound sealing the pores of the first mesoporous layer makes it possible to then deposit on said first layer a second, active and extremely fine layer which, combined with the choice of an appropriate polymer, makes it possible to obtain a permeability of the membrane to the treated solutions 10 to 20 times higher than that obtained with the membrane of U.S. Pat. No. 4,861,480.

Stages a) to c) of the process according to the invention relating to the deposition of the first mesoporous layer can be carried out using sol-gel methods described, e.g. for $Al_2O_3$, in FR-A-2 550 953.

After producing the first mesoporous layer on the surface of the porous support, into the pores of said layer is introduced a compound able to block said pores. This compound is in particular chosen as a function of the solvent which will be used in the following stage of producing the second active, organic layer.

Thus, the compound must not be dissolved by this solvent in order to make it possible to produce an active layer solely on the surface of the porous support. In the case of using dimethyl formamide as the solvent the compound can be sodium chloride.

The introduction of the compound into the pores can be carried out by impregnating the mesoporous layer by means of an aqueous solution of said compound followed by a drying and a controlled washing in order to eliminate the surface excess of the compound. In the case of NaCl, washing can take place with methanol.

When the solvent used in stage e) is dimethyl formamide, the compound able to seal the pores can also be gelatin, which can be introduced into the pores from an aqueous gelatin solution which is allowed to solidify and dry at ambient temperature.

After blocking the pores of the first mesoporous layer, it is possible to deposit the second, active, organic layer on the support by contacting the latter with an appropriate solution of the organic or organomineral polymer. The solvents used are in particular dependent on the nature of the polymer to be deposited.

In the case of polysulphones, polybenzimidazolones, and polyvinylidine fluorides, the solvent used can be dimethyl formamide, dimethyl sulphoxide (DMSO), N-methyl-2-pyrrolidone, dimethyl acetamide, etc.

For said deposition, the thickness of the second active layer can be regulated in particular by choosing the polymer concentration of the solution. Thus, the thickness of the active layer deposited increases with the polymer concentration of the solution used. Generally, the polymer concentrations are low and can e.g. be from 0.2 to 2%.

When the polymer used in a perfluorine ionomer such as Nafion, it is possible to use solutions of the ionomer in mixtures of water and alcohol, e.g. a water/ethanol mixture as described in FR-A-2597491. The use of a water/ethanol solution makes it possible to obtain very thin membranes having even higher permeabilities to water.

Following the application of the polymer solution drying takes place to evaporate the solvent and form the active layer. The separating properties of this active layer are more particularly dependent on the evaporation rate of the solvent, which is generally 95 to 100%. Immersion then takes place in an appropriate liquid to eliminate the compound sealing the pores and condition the membrane with a view to the use thereof. The liquid used is generally water.

Other features and advantages of the invention can be gathered from the following illustrative, non-limitative examples. In the following examples 1 to 6, use is made of the same porous alumina support coated with a mesoporous titanium dioxide layer, but using different active layers.

EXAMPLE 1

Membrane Having an Active Polybenzimidazolone Layer

The starting product is a tubular alumina support with an internal diameter of 7 mm and a pore diameter on its inner face of 0.2 μm. On the inner surface of said tubular support is deposited a mesoporous titanium dioxide finishing layer. For carrying out this deposition, contacting takes place between the inner face of the tubular porous support and a colloidal titanium hydroxide solution, followed by drying and heat treatment for 2 h at 450° C. This gives a mineral membrane having a mesoporous layer with a mean pore radius of 8.7 nm.

The mesoporous $TiO_2$ layer is then impregnated with an aqueous 25% by weight NaCl solution. This is followed by drying in order to eliminate the water and then controlled washing with methanol to remove the excess surface NaCl.

The thus treated support, coated with the mesoporous layer, whose pores have been blocked by NaCl, is then contacted with a 0.2% (wt/wt) polybenzimidazolone solution in dimethyl formamide (DMF). Drying then takes place to evaporate 99% of the solvent. The membrane is then immersed in water at ambient temperature to eliminate the sodium chloride and condition it. The active polybenzimidazolone (PBIL) layer has a thickness of 0.25 μm prior to the immersion of the membrane in water.

This is followed by the determination of the permeability and retention characteristics of the thus obtained membrane by circulating within it an appropriate solution (polyethylene glycol solution, water or NaCl solution) under a pressure of 6 MPa, at a temperature of 40° C., a tangential speed of 1 m/s and this is followed by the determination of the permeate flow rate and its solute concentration (polyethylene glycol 1000, polyethylene glycol 200 or NaCl). The results are given in the attached table.

Thus, when the solute is polyethylene glycol with a molecular weight of 1000 and the treated solution is an aqueous.50 g/l polyethylene glycol solution, the polyethylene glycol 1000 retention rate is 98%. The permeate flow in the case of pure water is 600 /d.m².

EXAMPLE 2

Membrane Having an Active Layer of Polyvinylidine Fluoride Grafted by Diamoethyl Methacrylate This example follows the same operating procedure as in example 1 for preparing an alumina support provided with a mesoporous $TiO_2$ layer, whose pores have been blocked by NaCl.

On said support is then deposited an active layer of polyvinylidine fluoride grafted by diaminoethyl methacrylate (PVDF-DMA) contacting said support with a 1% (wt/wt) PVDF-DMA solution in dimethyl formamide (DMF).

99% of the solvent is then evaporated, followed by the immersion of the membrane in pure water to eliminate the sodium chloride and condition it. This gives a membrane with an active PVDF-DMA layer with a thickness of 0.3 µm prior to immersion in water.

As in example, 1 determination takes place of the retention rate and flow rate of the permeate of the thus obtained membrane in the case of pure water and a polyethylene glycol solution containing 25 g/l of PEG 1000 and 25 g/l of PEG 200. The results are given in the attached table.

EXAMPLE 3

Organomineral Membrane Incorporating an Active Sulphonated Polysulphone Layer

The operating procedure of example 1 is followed for preparing an alumina support coated with a mesoporous $TiO_2$ layer. The pores of the layer are then blocked with gelatin by impregnating it with an aqueous 2 or 3% gelatin solution which is allowed to solidify, followed by drying at ambient temperature.

On the thus treated mesoporous layer is then deposited the active sulphonated polysulphone (PSS) layer by contacting the treated mesoporous layer with a 1% PSS solution in DMF. Following controlled evaporation of the solvent at a rate of 99%, the thus treated support is immersed in an aqueous 125 g/l $NaNO_3$ solution to eliminate the gelatin and condition the membrane. This gives a nanofiltration membrane, whose organic active layer has a thickness of about 0.4 µm prior to immersion in the aqueous solution.

As in example 2, the membrane permeate flow rates and the retention level are determined. The results obtained are given in the attached table.

EXAMPLE 4

Organomineral Membrane Having an Active Nafion Layer

This example follows the operating procedure of example 3 for preparing a porous alumina support coated with a mesoporous TiO layer, whose pores have been blocked by gelatin. On said support is deposited an active Nafion layer by contacting the mesoporous layer with a hydroalcoholic solution with 1.25% Nafion 117 in the form H+.

After completely evaporating the solvent, the membrane is hydrated by percolating water under rising pressure and temperature. This gives a membrane whose active layer has a thickness of 0.5 µm prior to the hydration treatment.

As in the preceding examples determination takes place of the retention rates and permeabilities of the membrane obtained and results are given in the attached table.

EXAMPLE 5

Organomineral Membrane Having an Active Nafion Layer

The operating procedure of example 4 is followed for preparing an alumina support coated with a mesoporous $TiO_2$ layer, whose pores have been blocked by gelatin. On the thus treated mesoporous layer is then deposited an active Nafion layer by contacting said layer with a hydroalcoholic solution incorporating 0.6% of Nafion 117. After complete evaporation of the solvent, the membrane is hydrated by percolating water as in example 4. The thickness of the active layer of the thus obtained membrane is approximately 0.1 µm prior to the hydration treatment.

As in the other examples the permeate flows and retention levels of the thus obtained membrane are determined and the results are given in the attached table.

EXAMPLE 6

Organomineral Membrane Having an Active Nafion 117 Layer in the Form Li+

The operating procedure of example 3 is followed for preparing a porous alumina support coated with a mesoporous $TiO_2$ layer, whose pores have been blocked by gelatin. The mesoporous layer is then contacted with a Nafion 117 solution in the form Li+ in a mixture of ethanol and water (50/50 by volume) having a Nafion concentration of 1.25%.

After complete solvent evaporation the membrane is hydrated by percolating water under rising pressure and temperature, as in example 4. The thickness of the active layer, calculated for the polymer not swollen by water is below 0.2 µm.

This is followed by the determination of the retention rates and permeate flow rates of the thus obtained membrane operating under the sane conditions as in the preceding examples. The results obtained are given in the attached table.

The attached table also gives in comparative form the retention rates and permeate flow rates obtained with the organomineral membrane of example 2 of U.S. Pat. No. 4,861,480.

The results of this table make it clear that the permeate flows are much higher with the membranes according to the invention than with the membrane of U.S. Pat. No. 4,861,480.

It can also be seen that the membrane of U.S. Pat. No. 4,861,480 has a 90% retention rate for sodium chloride, whereas the membrane of example 3 has a sodium chloride retention rate of only 5%.

The retention rates of the membranes according to the invention with respect to polyethylene glycol 1000 are very high ranging between 98 and more than 99.5%.

In the case of polyethylene glycol 200, high retention rates are also obtained.

Thus, as a result of the process of the invention and the choice of the active layers used, it is possible to obtain organomineral membranes having performance characteristics superior to those previously obtained.

TABLE

| | USA 4861480 | Ex. 1 | Ex. 2 | Ex. 3 | Ex. 4 | Ex. 5 | Ex. 6 |
|---|---|---|---|---|---|---|---|
| Polymer of second layer | PVDF-SCS[1] | PBIL[2] | PVDF DMA[3] | PSS[4] | Naflon 117 | Naflon 117 | Naflon 117 |
| Mesoporous layer | $Al_2O_3$ | $TiO_2$ | $TiO_2$ | $TiO_2$ | $TiO_2$ | $TiO_2$ | $TiO_2$ |
| Second layer thickness ($\mu$m) | 1 | 0.25 | 0.3 | 0.4 | 0.5 | 0.1 | <0.2 |
| Permeate flow: $H_2O$ ($l \cdot d^{-1} \cdot m^{-2}$) 6 MPa 40° C. | 95 | 600 | 2500 | 2100 | 1131 | 2340 | 3440 |
| Permeate flow: aq. sol. - 25 g $\cdot l^{-1}$ of PEG 1000[5] and 25 g $\cdot l^{-1}$ of PEG 200[6] ($l \cdot d^{-1} \cdot m^{-2}$) 6 MPa 40° C. u = 1 m$5^{-1}$ | | | | | | | |
| PEG 1000 retention (%) | | aq. sol. - 50 g $\cdot l^{-1}$ of PEG 1000[5] 98 | 98.6 | 98.9 | >99.5 | 99.3 | 98.8 |
| PEG 200 retention (%) | | | 65.2 | 56 | 66.5 | 56 | 69.6 |
| NaCl solution - NaCl concentration (g $\cdot l^{-1}$) | 3 | | | 5 | | | |
| NaCl retention (%) | 91 | | | 10 | | | |

[1] PVDF-SCS = polyvinylidine fluoride grafted by chlorosulphonated styrene
[2] PBIL = polybenzimidazolone
[3] PVDF-DMA = polyvinylidine fluoride grafted by diaminoethyl methacrylate
[4] PSS = sulphonated polysulphone
[5] PEG 1000 = polyethylene glycol with molecular weight 1000
[6] PEG 200 = polyethylene glycol with molecular weight 200

We claim:

1. A reverse osmosis or nanofiltration membrane, comprising:
a porous inorganic material support coated on one face with a first mesoporous, inorganic material layer having a mean pore radius below 10 nm and a second active layer located on the first mesoporous layer and having a thickness of 0.1–1 $\mu$m, prepared from an organomineral or organic polymer selected from the group consisting of sulfonated polysulfones, polybenzimidazalones, polyvinylidene fluorides having diaminoethyl methacrylate grafted thereon and perfluorine ionomers.

2. The membrane according to claim 1, wherein the inorganic material of the porous support is selected from the group consisting of alumina, nickel, nickel alloys, stainless steel, silicon carbide and carbon.

3. The membrane according to either one of claim 1 or 2, wherein the inorganic material of the first mesoporous layer is titanium dioxide, zirconium dioxide or alumina.

4. The membrane according to claim 1, wherein the perfluorine ionomer complies with the formula:

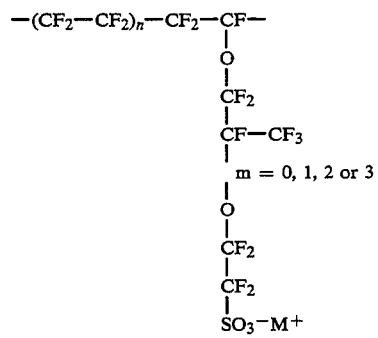

wherein M represents a proton, a metal cation or a complex cation, m is zero or an integer from 1 to 3 and n is zero or an integer from 1 to 16.

5. The membrane according to claim 4, wherein the inorganic material of the first mesoporous layer is titanium dioxide, zirconium dioxide or alumina.

6. The membrane according to claim 4, wherein the porous support is of alumina and wherein the first mesoporous layer is of titanium dioxide.

7. The membrane according to claim 4, wherein the membrane retains solutes having molecular weights from 50 to 1000.

8. The membrane according to claim 1, wherein the porous support is of alumina and wherein the first mesoporous layer is of titanium dioxide.

9. The membrane according to claim 1, wherein the membrane retains solutes having molecular weights ranging from 50 to 1000.

10. A process for the preparation of a reverse osmosis or nanofiltration membrane according to claim 1, which comprises the following successive steps:

a) applying to one face of a porous inorganic material support a colloidal solution of the inorganic material which forms the first mesoporous layer;
b) drying the thus applied colloidal solution;
c) heat treating the dried layer;
d) introducing, into the pores of the thus dried layer, a compound which is able to block the pores;
e) contacting the support coated with the first mesoporous layer containing said compound with a solution of an organomineral polymer or the organic polymer for forming the second layer in a solvent which does not dissolve the compound of step (d);
f) drying the solution in order to evaporate the solvent; and
g) immersing the thus treated support in a liquid which is able to dissolve the compound of step (d) without dissolving the first mesoporous layer and the second active layer.

* * * * *